Patented Sept. 1, 1942

2,294,760

UNITED STATES PATENT OFFICE 2,294,760

PROCESS FOR COATING METAL SURFACES

William C. Morris, North Chicago, Ill., assignor to Poor & Company, Chicago, Ill., a corporation of Delaware No Drawing. Application January 12, 1940, Serial No. 313,637

6 Claims. (Cl. 117—129)

This invention relates to a process for coating metallic surfaces, specifically iron and steel surfaces, with a vitreous and fused enamel coating and bonding the same to the metallic surface.

A further object of my invention is to provide a process of the character referred to which involves the use of agents or materials which, when used in accordance with the process of the present invention, operate to control the thermal oxidation of the ferrous metal surface.

A further and important object of the invention is to employ a temperature for firing the coated metal much lower than the temperature employed in similar coating operation and particularly much lower than the temperatures employed in sheet iron enamel processes, thereby permitting the present invention to be carried out in connection with very much lighter gauge metal sheets than heretofore possible. That is to say, according to the present invention, the coated metal is fired in an oxidizing atmosphere which is of necessity slightly above the fusing point of the glass or enamel, but at the same time is below the critical point of the steel which is below 750° C. or 1380° F. Below this temperature no physical changes take place in the steel and there is less danger of warpage, strain and softening of the steel. With this process 30 gauge steel has been and is being successfully coated without any warpage and strain in the steel.

The present invention can be used successfully with several glass or enamel frit formulae, and for purposes of the present application two such formulae may be used as an example:

*Formula 1*

|  | Parts by weight |
|---|---|
| Feldspar | 27.3 |
| Borax | 31.1 |
| Silica | 7.0 |
| Meltopax (sodium zirconium silicate) | 3.0 |
| Soda ash | 7.5 |
| Soda nitrate | 0.7 |
| Calcite | 1.05 |
| Fluorspar | 4.00 |
| Cryolite | 5.45 |
| Litharge | 9.65 |
| Sod. sil. fluoride | 1.70 |
| Titanium dioxide | 1.20 |
| Bone ash | 0.35 |
| Sodium antimonate | 0.125 | and/or

*Formula 2*

|  | Parts by weight |
|---|---|
| Boric acid | 9.4 |
| Sod. silica fluoride | 10.4 |
| Litharge | 44.8 |
| Barium carbonate | 15.55 |
| Silica | 13.2 |
| Zinc oxide | 4.7 |

A distinctive feature of the present invention is to utilize with these glass or frit formulae molybdenum or various of its oxides or salts which act as agents to cause the fused glass or porcelain to be bonded to the ferrous metal surface over which it has been previously applied. These molybdenum compounds are effective in producing bond between the glass and the ferrous metal surface at relatively low temperatures. Primarily molybdic acid, having the formula $MoO_3$, is an effective bonding agent having the characteristics referred to above. In Formula 1 above one percent (1%) of molybdic acid is used, and in Formula 2 eight-tenths of one percent is used. That is, for one hundred pounds of Formula 1 use one pound of molybdic acid, and for one hundred pounds of Formula 2 use eight-tenths of one pound or 12.4 ounces.

Other molybdenum compounds that are effective for the specified purpose and which react to produce bond with glass or frit formulae of the character indicated, are:

1. Ferrous molybdate
   $FeMoO_4 \cdot H_2O$
2. Ferric molybdate
   $Fe_2(MoO_4)_3 \cdot xH_2O$
3. Iron polymolybdates
   $FeMo_2O_7 \cdot H_2Mo_3O_{10}$
   $FeMo_2O_7 \cdot FeMo_3O_{10}$
   $H_2Mo_2O_7 \cdot FeMo_3O_{10}$
4. Thio molybdates
   $MoS_2$
   $MoS_3$
5. Ferrous thiomolybdate
   $FeMoS_4$
6. Cuprous molybdate
   $Cu_2MoO_4 \cdot H_2O$
7. Cupric molybdate
   $CuMoO_4 \cdot H_2O$
8. Cuprous polymolybdates
   $Cu_2Mo_2O_7 \cdot H_2Mo_3O_{10}$
   $Cu Mo_2O_7 \cdot Cu_2Mo_3O_{10}$
   $Cu_2Mo_2O_7 \cdot FeMo_3O_{10}$
   $H_2Mo_2O_7 \cdot Cu_2Mo_3O_{10}$
   $FeMo_2O_7 \cdot Cu_2Mo_3O_{10}$ 9. Cupric polymolybdates
   $CuMo_2O_7.H_2Mo_3O_{10}$
   $CuMo_2O_7.CuMo_3O_{10}$
   $H_2Mo_2O_7.CuMo_3O_{10}$
10. Cupric-ferrous polymolybdates
    $CuMo_2O_7.FeMo_3O_{10}$
    $FeMo_2O_7.CuMo_3O_{10}$
11. Cupric-cuprous polymolybdates
    $CuMo_2O_7.Cu_2Mo_3O_{10}$
12. Cuprous-cupric polymolybdate
    $Cu_2Mo_2O_7.CuMo_3O_{10}$
13. Cuprous thio molybdate
    $Cu_2MoS_4$
14. Cupric thio molybdate
    $CuMoS_4$
15. Lead molybdate or wulfenite
    $PbMoO_4$
16. Molybdic acid
    $MoO_3$ Some of these molybdenum bonding compounds work best if mixed with the raw glass batch before smelting and thus become an integral part of the glass, and others work best as a mill addition to the fritted glass. All of the molybdates and thio molybdates of copper and iron must be smelted into the glass, not from the standpoint of not bonding the glass to the steel, but from the deleterious effects on the glass itself, such as pimply surface or copper heads. If smelted into the glass, the iron and copper and sulfur are non-injurious to the glass. As to wulfenite or lead molybdate the same works best as a mill addition, and molybdic acid works equally well either as a mill addition or on being smelted into the glass.

A third way of utilizing molybdenum compounds is to form a soluble molybdate such as ammonium molybdate and immerse the articles to be coated in an aqueous solution of this soluble molybdate. In this immersion bath, which follows cleaning and pickling, a thin molybdate film is produced which acts in a manner similar to having the molybdate incorporated in the glass, either at the smelter or as a mill addition. Following this molybdate bath immersion, the metal articles are rinsed, neutralized and dried, after which they are coated with the glass in question, and then fired under the low temperature conditions contemplated by the present invention.

Still another method of applying the bonding coating to the metal is, first to spray the metal with a glass slip containing molybdenum, then, without drying, spraying to a full coat of a glass not containing molybdenum. The first coat or part coat should be on an average of one-fifth to one-half of the total thickness of the full coat which does not need to be heavier than normal.

Another method of applying the bonding element is to mill such a quantity of an insoluble molybdate with some suspending agent such as clay with sufficient set-up agent to form a workable suspension of the molybdate in question in water; then to first spray a thin film of this over the object to be coated, and with or without drying, to overspray with the glass slip not containing molybdenum.

Regardless of the molybdate started with, except the copper molybdates, the final end product of the molybdate, after the coated ware is fired, is a mixture of iron molybdates which have the ability of bonding the vitreous coating very tightly to the ferrous metal surface. The copper molybdates are similar in their properties except that they remain largely as copper molybdates during the firing operation. In either case the iron molybdate or copper molybdate molecules are so oriented that the copper or iron atoms are bonded to the nascent iron oxide and the molybdenum atoms to the glass in question.

The thiomolybdates act similarly to the oxy-compounds, the sulfur being oxidized to sulfur dioxide and evolved. It has been found from running a large number of pieces of ferrous metal of various analyses and in various complex shapes that the molybdates give good bond over a wide range of steels and shapes and that the bond is in general very reproducible.

In the actual carrying out of the process the action involved in bonding the glass to the steel may be further explained by visualizing the coating on the metal as a series of laminations built up from the metal out, each successive layer becoming poorer in iron oxide and richer in glass. In the case of the utilization of the immersion bath of a soluble molybdate, the series would be as follows: starting with the metal and working out, first layer on metallic surface, pure iron oxide; second layer, rich in iron oxide and low in bonding molybdate compound; third layer rich in molybdate bonding compound and poor in iron oxide; fourth layer practically pure bonding compound; fifth layer high in bonding compound and low in glass; sixth layer low in bonding compound and rich in glass; and seventh and final layer pure glass or the surface of the vitreous coating.

Taking one phase of the process, the raw materials for the glass are mixed and smelted at a temperature of approximately 2000° F. until reaction is complete and immediately this molten glass is poured into cold water with agitation to quench the glass and break it into small pieces, producing the so-called "frit." This fritted glass is then ground in a ball mill with clay water and colors if necessary, and the bonding molybdate compound, if it is not previously incorporated in the glass, milled to a fineness of 0–25% residue on a 200 mesh screen, preferably to a fineness of 3–7% residue on a 200 mesh screen.

The metal articles to be coated are first cleaned, using some commercial cleaning material, then rinsed, pickled in acid, rinsed, neutralized and dried. If an immersion bath of molybdate is to be used, it is used following the pickle rinse and prior to neutralizing. The metal article is then coated with the glass slip, either by spraying, dipping, slushing or other known means; dried to remove moisture and fired at the proper temperature, which may be at 1250° F. for Example 1, and 1170° F. for Example 2. In any case, the upper limit of the temperature range does not exceed 1600° F., thereby avoiding warpage and other physical change in the metals being coated.

A series of glasses have been developed which mature at relatively low temperatures—from 1100 to 1320° F., all of which can be bonded to steel by the use of the appropriate molybdate compound. By using glasses which mature below the first critical point of steel, known as the first critical temperature, practically all strain and warpage set up in the steel by raising the article to be coated above the critical point is done away with and the major portion of ware reworked or discarded for this reason is done away with. However, it is to be understood that the present method of bonding glass or enamel to steel is not limited to the relatively low firing glasses, but may also be used in regular porcelain enamels, although the bonding agents normally used in bonding enamel to steel (cobalt, nickel and manganese) do not work in low firing enamels.

By way of definition of certain terms employed herein it may be explained that the reference to neutralizing the rinsed metal articles preferably means immersion in a warm bath of mild alkali usually consisting of mixtures of sodium carbonate and borax in varying amounts, the total concentration being in general less than one ounce per gallon. In some cases where the water is extremely hard phosphates or other water softeners are used. More specifically, there is used a mixture of three parts of soda ash and one part of borax by weight in a total concentration of one-fourth ounce per gallon. The solution is used at 140° F. and the time of immersion is four minutes.

As to the alternative method hereinbefore referred to wherein an insoluble molybdate is milled with a suspending agent, such as clay, with sufficient set-up agent to form a workable suspension of the molybdate in question in water, the common "set-up" agents used are borax, ammonium carbonate, magnesium sulfate, magnesium carbonate, sodium aluminate, and sodium nitrite; usually and preferably borax and magnesium sulfate, either together or separately.

It will be further understood that modifications in the process, materials employed, and the formulae thereof, proportions of ingredients and temperature ranges, falling within the scope of the appended claims may be resorted to without departing from the spirit or scope of the invention.

I claim:

1. A process of coating ferrous metal surfaces which consists in first preparing a raw glass batch including a molybdate selected from the group of iron and copper molybdates whose iron or copper atoms bond to the nascent iron oxide of the metal, then subjecting this composite batch to smelting temperature and forming same into a frit, and subsequently applying the same to the metal surface and firing the coated metal at a temperature above the fusing point of the vitreous material and below the critical point of the metal.

2. A process of coating ferrous metal surfaces which consists in first smelting a raw glass batch with an iron molybdate therein, and subsequently applying this material to the metal surface and firing the coated metal at a temperature above the fusing point of the vitreous material and below the critical point of the metal.

3. A process of coating ferrous metal surfaces which consists in first smelting a raw glass batch with a copper molybdate therein, and subsequently applying this material to the metal surface and firing the coated metal at a temperature above the fusing point of the vitreous material and below the critical point of the metal.

4. A process of coating ferrous metal surfaces which consists in first smelting a raw glass batch with a copper-iron polymolybdate therein, and subsequently applying this material to the metal surface and firing the coated metal at a temperature above the fusing point of the vitreous material and below the critical point of the metal.

5. A process of coating ferrous metal surfaces which consists in first smelting a raw glass batch with an iron polymolybdate therein, and subsequently applying this material to the metal surface and firing the coated metal at a temperature above the fusing point of the vitreous material and below the critical point of the metal.

6. A process of coating ferrous metal surfaces which consists in first smelting a raw glass batch with a copper polymolybdate therein, and subsequently applying this material to the metal surface and firing the coated metal at a temperature above the fusing point of the vitreous material and below the critical point of the metal.

WILLIAM C. MORRIS.